(12) United States Patent
Narayanaswami et al.

(10) Patent No.: US 7,743,422 B2
(45) Date of Patent: Jun. 22, 2010

(54) SYSTEM AND METHOD FOR VALIDATING A COMPUTER PLATFORM WHEN BOOTING FROM AN EXTERNAL DEVICE

(75) Inventors: Chandrasekhar Narayanaswami, Wilton, CT (US); Mandayam Thondanur Raghunath, Bangalore (IN); Nishkam Ravi, Piscataway, NJ (US); Marcel-Catalin Rosu, Ossining, NJ (US)

(73) Assignee: International Business Machines Corporation, Armonk, NY (US)

( * ) Notice: Subject to any disclaimer, the term of this patent is extended or adjusted under 35 U.S.C. 154(b) by 975 days.

(21) Appl. No.: 11/508,019

(22) Filed: Aug. 21, 2006

(65) Prior Publication Data

US 2008/0046990 A1      Feb. 21, 2008

(51) Int. Cl.
*G06F 12/16* (2006.01)
*G06F 11/30* (2006.01)

(52) U.S. Cl. .............................. 726/25; 726/9; 713/193; 713/194

(58) Field of Classification Search ..................... 726/9, 726/25; 713/193, 194
See application file for complete search history.

(56) References Cited

U.S. PATENT DOCUMENTS

| | | | |
|---|---|---|---|
| 6,880,054 B2 * | 4/2005 | Cheng et al. ................. | 711/164 |
| 6,920,553 B1 * | 7/2005 | Poisner ........................... | 713/2 |
| 7,272,831 B2 * | 9/2007 | Cota-Robles et al. .......... | 718/1 |
| 2002/0161931 A1 * | 10/2002 | Morita et al. ................ | 709/310 |
| 2004/0123127 A1 * | 6/2004 | Teicher et al. ................ | 713/193 |
| 2005/0138409 A1 * | 6/2005 | Sheriff et al. ................ | 713/200 |
| 2006/0206702 A1 * | 9/2006 | Fausak ........................... | 713/2 |
| 2007/0005919 A1 * | 1/2007 | van Riel ....................... | 711/163 |
| 2007/0283444 A1 * | 12/2007 | Jang ............................. | 726/26 |

OTHER PUBLICATIONS

Virus Chase USB—USB Drive Intergrate Dynamic Virus Vaccine. User's Manual. May 2005. Edition.*

* cited by examiner

*Primary Examiner*—Minh Dieu Nguyen
(74) *Attorney, Agent, or Firm*—Michael J. Buchenhorner; Vazken Alexanian

(57) ABSTRACT

A portable device for connecting to a host information processing platform includes: a digital information storage medium storing an operating system image, secure data, applications, and system state of an owner of the portable device, wherein the medium is in read only mode until a set of tests are run on the host platform; and a platform validation program for: running the plurality of tests on the host computer to determine whether the host is safe, depending on the outcome of the tests, presenting the owner with a user-identifiable message, prompting the owner to enter decryption credentials, and receiving the decryption credentials. The portable device could also optionally include subsystems that provide additional functionality to the owner such as media playback, communications, and entertainment.

18 Claims, 2 Drawing Sheets

SYSTEM AND METHOD FOR VALIDATING A COMPUTER PLATFORM WHEN BOOTING FROM AN EXTERNAL DEVICE

CROSS-REFERENCE TO RELATED APPLICATIONS

Not applicable.

STATEMENT REGARDING FEDERALLY SPONSORED-RESEARCH OR DEVELOPMENT

Not applicable.

INCORPORATION BY REFERENCE OF MATERIAL SUBMITTED ON A COMPACT DISC

Not Applicable.

FIELD OF THE INVENTION

The invention disclosed broadly relates to the field of computer security and more particularly relates to the field of verifying a PC platform when booting from an external device.

BACKGROUND OF THE INVENTION

A personal computer (PC) usage model that is gaining popularity is for users to carry their data and applications on portable storage media (such as USB flash drives, or keys, or USB hard drives) and access their data or run their applications on several different PCs. A common usage model occurs when a user downloads files and/or applications from an office computer onto a flash drive and then transports the flash drive to a home computer, and vice versa. Business travel and field work are other very common uses for this type of data handling. Several portable devices such as music and media players, PDAs, digital cameras, game consoles, and cellular phones include large amounts of storage. Such devices may appear as portable storage devices when connected to a host computer, for example through a USB cable. Therefore users may carry data and programs on such devices and use the host computer to access the data or execute the programs resident on the portable device. These devices may be used for their primary purpose, e.g., listening to music, when they are not connected to a host computer.

Sometimes users store their sensitive content on the portable storage media in encrypted form, using password protection, to prevent the data from being compromised if the storage media is lost. In some cases, biometrics, such as finger prints, are employed to protect the encrypted data on the portable storage media. It is also possible to have different levels of encryption to protect data that has different levels of confidentiality.

While the security mechanisms mentioned above help protect the user's data if the media is lost, these mechanisms do not protect the user's data from viruses, or other malicious software that may be present on the foreign PCs used to access the data. When the user plugs in his media into a foreign PC and provides one or more decryption credentials (passwords or biometrics), the data is potentially accessible to malicious software that may be present on that PC.

The user needs a way to validate the PC that he is about to use, and verify that it is not compromised by malicious software before proceeding to use the machine in a more full-fledged manner, for example presenting his decryption credentials on the PC to enable access to his sensitive data. This is somewhat similar to the problem of securely booting a regular PC platform, i.e., making sure all the software started on a PC during the boot process is valid. Over the past several years, major players in the PC industry have agreed on generic hardware/software architecture (e.g., the Trust Computing Group or TCG Specification) designed to support important security capabilities (secure boot included) on the most popular computing architectures (PCs, PDAs, cell phones).

Unfortunately, when booting from external storage devices, TCG compliant PCs cannot be easily configured to verify the integrity of the host platform before asking for the user credentials, which are later used to decrypt user data on the portable storage medium. This is because TCG was designed with the assumption that TPM (Trusted Platform Module) is used to verify the integrity of a boot sequence that was previously performed on the platform; while booting from an external storage device brings together in a boot sequence software components that have never worked together before. For basically the same reason, not even the TPM 1.2 capabilities, including DRTM (Dynamic Root of Trust Measurement), can be used in the case of booting from an external device. In addition, TPM-equipped PCs are not yet widely available. As a result, there is a need for a different approach to verifying a PC platform when booting from an external device.

SUMMARY OF THE INVENTION

Briefly, according to an embodiment of the invention a portable device with a digital information storage medium includes an interface for connecting to a host information processing platform and a mechanism for ensuring that the host platform is safe enough to provide security credentials. The digital information storage medium on the portable device is used for storing an operating system image, secure data, applications, and system state such as applications preferences and settings, computing session information, suspended virtual machines, of an owner of the portable device. If the architecture of the portable device permits, the storage medium is in read only mode until a set of tests are run on the host platform. A platform validation program presents the owner with a user-identifiable message after successfully running the plurality of tests on the host platform to determine whether the host platform is safe and notify the user. The user may then make more full-fledged use of the host platform and start running more sensitive applications. For example if the host platform is safe, a program that prompts the owner to enter decryption credentials may be started. When the host platform is safe it receives the decryption credentials and uses then to access the encrypted data on the portable device. Another example could include resuming an suspended virtual machine, preferably encrypted, that is stored on the portable device. Yet another example could include starting a second operating system or a desktop environment with several applications.

According to another embodiment a method for connecting a portable device with a digital storage medium to a host information processing platform, includes steps of: storing an operating system image, secure data, applications, and system state of an owner of the portable device in a digital information storage medium; setting the medium in read-only mode until a set of platform validation tests are run on the host platform, if the architecture of the portable device permits such read-only mode; after successfully running the plurality of tests on the host computer, presenting the owner with a user-identifiable message that changes frequently for determining whether the host is safe, and notifying the user. The user may then run more sensitive applications on the host platform.

DETAILED DESCRIPTION

Figure 1:
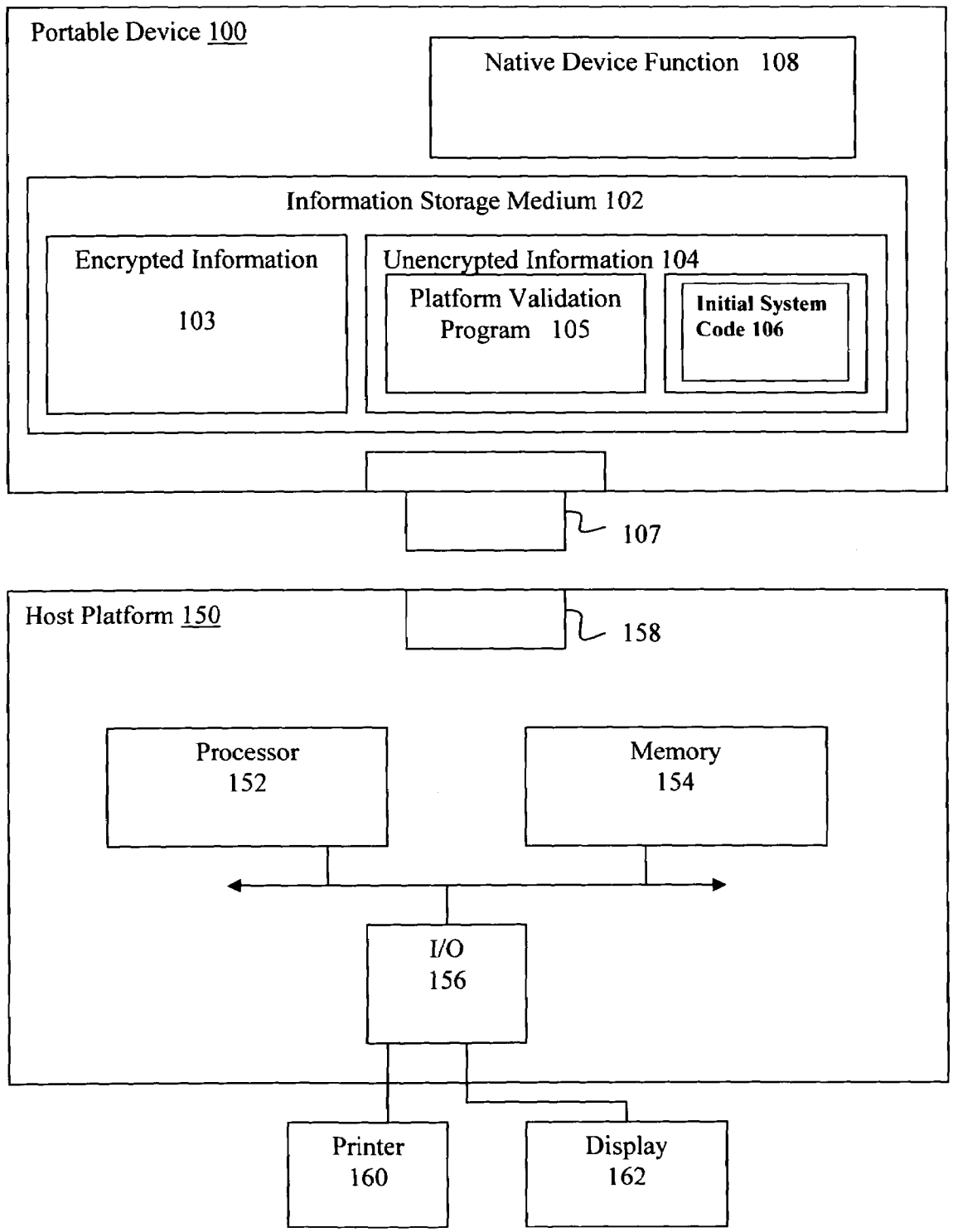
FIG. 1 is a high level block diagram showing an information processing system according to an embodiment of the invention.

Referring to FIG. 1, there is shown a block diagram of a portable device 100 according to an embodiment of the invention. The portable device 100 comprises a digital information storage medium 102 and an optional native device function component 108. The optional native device function component 108 allows the portable device to provide functions such as media playback, communications, etc. The digital information storage medium 102 stores an operating system image, secure data, applications, and system state of the owner of the portable device 100. Secure data and all the information that needs to be protected until the host computer platform is validated are shown as Encrypted Information 103 in the figure. All the other data, which is stored unencrypted on the Information Storage 102, and which includes the Platform Validation Program 105, is shown as Unencrypted Information 104. The other unencrypted information includes a boot operating system image and supporting applications is shown as Initial System Code 106. If the medium 102 supports mode changing between read-only and read-write, the medium 102 is set in read-only mode until a set of tests are completed successfully on the host platform 150; if the trust level is considered acceptable, the medium 102 is then set to read-write mode.

The portable device 100 includes an interface and connector 107 for connecting to the host computer platform 150. The connector 107 is preferably a USB connector. The host computer 150 includes an interface 158 compatible with the connector 107, a processor 152, a memory 154, and an input/output interface 156. The input/output devices may include a printer 160 and a display 162. The memory 154 represents either a random-access memory or mass storage. It can be volatile or nonvolatile. The system 150 can also comprise a magnetic media mass storage device such as a hard disk drive.

The I/O subsystem 156 may comprise various end user interfaces and allows connection of peripherals such as a display, a keyboard, a mouse, and other devices such as a printer, digital camera, etc. The I/O subsystem 156 may further comprise a connection to a network such as a local-area network (LAN) or wide-area network (WAN) such as the Internet. What has been shown and discussed is a highly-simplified depiction of a programmable computer apparatus. Those skilled in the art will appreciate that other low-level components and connections are required in any practical application of a computer apparatus.

In this embodiment we solve the problem of validating a host computer platform 150 when booting from an external device such as the portable device 100 by storing a platform validation program 105 on the portable device that will run a series of tests on the platform 150 to verify that the platform 150 is safe from viruses or other malicious software.

Figure 2:
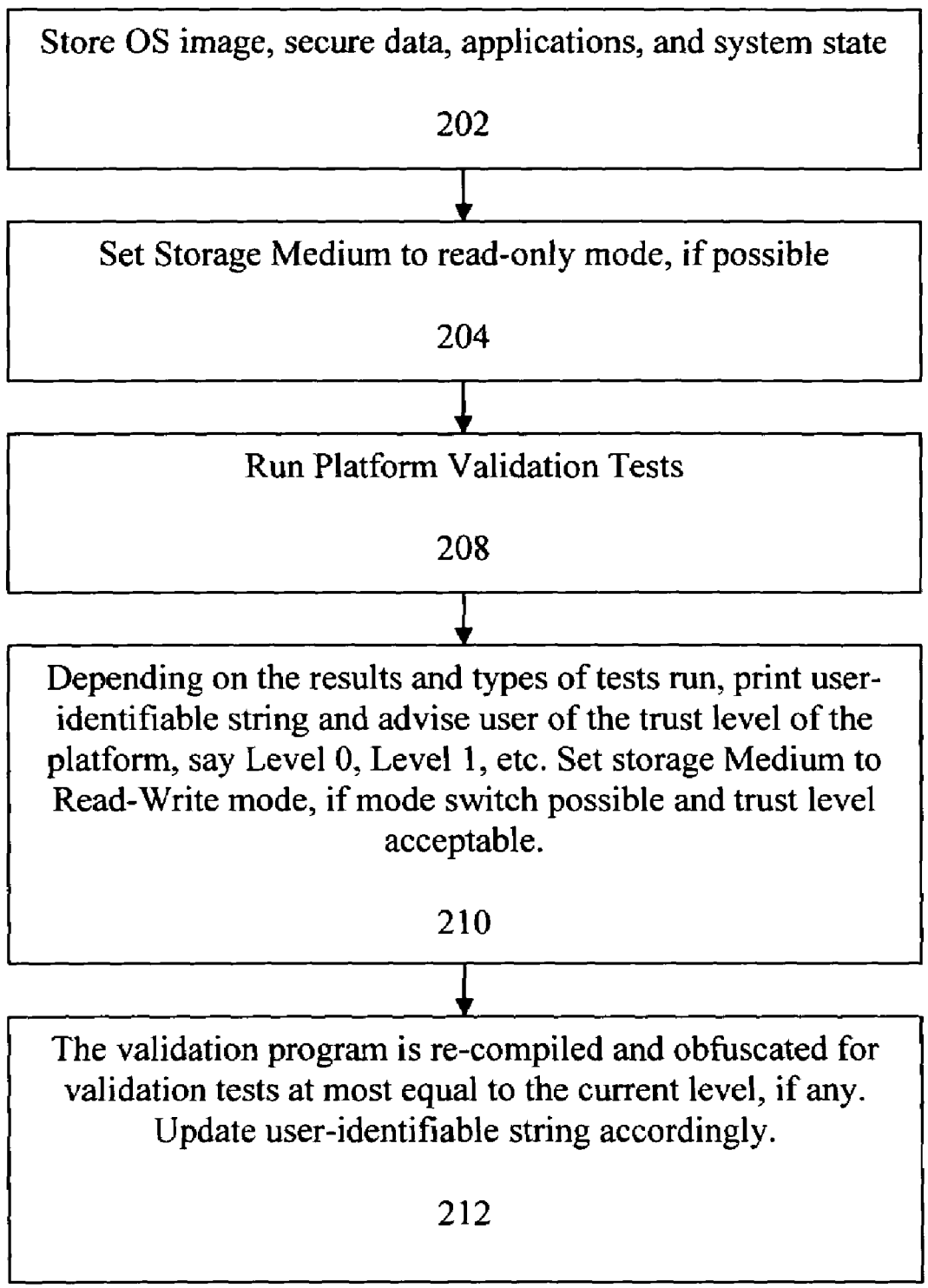
FIG. 2 is a flowchart of a method according to an embodiment of the invention.

Referring to FIG. 2, there is shown a flow chart illustrating an information processing method 200 for validating the host computer platform 150 when booting from the portable device 100, according to an embodiment of the invention. The method begins at step 202, storing an operating system image, secure data, applications, and system state of an owner of the portable device 100 in a digital information storage medium 102. It is possible that the host platform 150 may contain malicious software that attempts to modify the contents of the portable storage media 102. To prevent such an attempt, in step 204 the medium 102 is write-protected, if the architecture of the portable device permits such read-only mode, until the validation program 105 indicates that the platform 150 is safe. This prevents malicious software on the host platform 150 from erasing the contents of the portable storage media 102, or introducing other malicious software on the portable storage media 102.

The validation program 105 validates the host platform 150 by running a series of tests on the host platform 150. In general, it is difficult for a validation program 105 running on a platform 150 to examine the platform 150 and verify that the platform 150 is safe. Since the platform 150 provides the environment for the validation program 105 to run, the platform 150 can fool the validation program 105 into seeing a clean platform. The approach taken in an embodiment of the invention is to raise the level of difficulty associated with fooling the validation program 105 by eliminating some of the easy ways by which the platform 150 can fool the validation program 105.

At the simplest level the platform 150 can simply not run the validation program 105 at all in step 208 and instead pretend that the validation program 105 executed, and present the output that the program would present if it had run. We prevent this sort of deceit by making the validation program 105 include a message that the user can identify and verify to be correct. In step 210 the owner is presented with this message containing user-identifiable data that changes frequently, for example, from session to session, to ensure that the platform 150 cannot guess the content of this message. The user-identifiable data could be in the form of an alpha-numeric text string, voice data, or a digital image. The user-identifiable data tells the owner that it is safe to proceed with more full-fledged use of the platform. The user may then input encryption credentials and proceed with using the software and data contained in the encrypted section 103 on the platform 150. One example of such a user-identifiable message is a text string that indicates the last time the portable storage media 100 was used, and the identity of the platform 150 on which it was last used. Updating the data message frequently also avoids the situation where the platform 150 simply presents an "it is safe" message without running the validation program 105 at all.

The platform 150 may try to extract the message from the validation program 105 and simply present it without running the tests. To prevent this, the validation program 105 is obfuscated using code and data obfuscation techniques to prevent the platform 150 from extracting the message easily. The user-identifiable string is printed by the validation program while the validation tests are performed, preferably at constant rate; note that the string may include system information such as processor type and speed, amount of memory and type of peripherals, manufacturer name, etc. In addition, address obfuscation is used at run-time, such that various code and data segments of the validation program are placed at addresses selected when the execution starts.

Validation tests include but are not limited to verifying the absence of a virtual machine and the validity of the system BIOS. Running inside a virtualized environment is very dangerous for the user of the mobile device: it is very easy for a malicious virtual machine monitor to keep a copy of the information accessed by the mobile user. More elaborate attacks could make a copy of the entire encrypted partition or even change the information presented to the user or the content of the encrypted partition. The relevant validation tests check for the presence of known virtualized environments, such as those from VMware and Microsoft (Virtual PC), and for a generic virtualized environment by testing the implementation of specific instructions in the instruction set architecture (ISA) that are known to behave differently when running inside a virtualized environment, such as SGDT (Store Global/Interrupt Description Table) in the IA32 ISA. Other tests could include timing certain computations or a combination thereof and comparing the execution times with the reported hardware on the platform. The mix and frequency of computations can be varied between sessions to make it difficult for the attacker to fake the results. Examples of such timing tests could include scientific computations, software rendering of graphical primitives, cryptographic algorithms, etc. Other examples could include attaching a portable user owned and trusted peripheral with one of all of computational capability, storage, and display, through an interface on the platform that is used to, perform a computation jointly with the validation program running on the platform, or move data between them, or render graphical objects, and measuring times for the tasks.

The system BIOS is verified to test for the absence of flash-resident viruses or worms. BIOS validation is made difficult by the large number of BIOS architectures and configurations currently deployed. If the host platform supports the trusted Computing paradigm, the BIOS validation tests try to take advantage of the additional information available.

Once the validation tests are completed, the user receives the entire message together with the trust level of the platform as determined by the validation program 105. If the user decides that the level is acceptable, he enters his decryption credentials that allow access to secure data and programs on the portable storage media. Such data and programs include but are not limited to a second operating system image and associated system and user applications and data. In addition, the second operating system image could be run in a virtual environment and kept in a suspended state to allow for faster start-up times.

Until the tests are executed and safety measurements are complete, the portable storage media 102 is set in a read-only mode, if possible, to prevent modification of its contents, for instance by a platform 150 that is compromised. Note that only some storage media allow their read-write mode to be set dynamically. This ensures the safety of the portable storage media 102 when it encounters a malicious platform. It detects the malicious platform and informs the user that the platform is malicious by displaying or printing a message. Even though the portable storage media 102 was plugged into a malicious platform, since it was marked read-only, the user does not have to worry about the contents of the portable storage media 102 being compromised in some way. Note that for a storage media that cannot be write-protected, a malicious platform still cannot access the confidential data on the media, as it is encrypted; however, it can modify or erase it.

The host platform 150 may modify the validation program 105 to simply indicate that all the tests were successful. Again code obfuscation applied to the validation program 105 prevents the platform 150 from easily modifying the program to indicate success on all tests regardless of actual test results.

Depending on the number and type of tests that passed, in step 210 the platform validation program 105 informs the user that he can provide his decryption credentials only for level 0 confidential data, or level 0 as well as level 1 confidential data, and so on. Once validated in this manner, the platform validation program 105 itself is rebuilt with a new message that will be produced in the next session. Note that the maximum level of trust that the new build of the validation program 105 will be able to guarantee on its next run, for the same or a different platform, depends on the level of trust in the current platform. The user may periodically use a platform 150 in which he has a highest level of trust. The message could be in the form of an alphanumeric text string printed on the printer 160 or a digital display shown on the display 162. This message advises the user that it is safe to provide decryption credentials for a certain level of confidentiality. The validation program 105 itself is obfuscated using code and data obfuscation techniques to make it harder for someone to attack the platform validation program 105.

If the tests reveal a problem with the host platform 150, the message will reflect that the user is granted lowest security level and the entire storage medium 102 or some subset of it will remain write-protected. This assures that the user's data is not compromised by interfacing with a malicious platform.

In step 212 the platform validation program 105 is re-compiled using a compiler stored on the portable storage media 102 and obfuscated before being stored back on the portable storage media 102 for use the next time.

Therefore, while there have been described what are presently considered to be the preferred embodiments, it will understood by those skilled in the art that other modifications can be made within the spirit of the invention.

We claim:

1. A portable device for connecting to a host information processing platform, the portable device comprising:
   a digital information storage medium storing an operating system image, and one or more of data, secure data, applications and system state of a user of the portable device; and
   a platform validation program for:
      running a plurality of tests on the host computer to determine whether the host is safe from malicious software, and
      causing the host information processing platform to present to the user of the portable device a user-identifiable message that changes every time the portable device connects to the host information processing platform and notifies the user whether the information processing platform is safe;
   wherein the user-identifiable message indicates a last time that the portable device was used, a prior host platform in which the portable device was used, the characteristics of a current host platform, including at least one characteristic selected from a group consisting of: system manufacturer name, model number, serial number, motherboard manufacturer name, processor speed, an amount of memory installed; and I/O devices attached to the portable device.

2. The portable device of claim 1 wherein the platform validation program further prompts the user to enter his credentials for accessing secure data and programs of the host information processing platform if it is determined that the host information processing platform is safe.

3. The portable device of claim 2 wherein upon receiving and verifying the user's credentials the platform validation program rebuilds the user-identifiable message for presentation on a subsequent session.

4. The portable device of claim 1 wherein the digital information storage medium is in read-only mode until the plurality of tests run successfully on the host information processing platform.

5. The portable device of claim 1 wherein some parts of the digital information storage medium are in read-only mode until the plurality of tests finish and the user-identifiable message is printed, where the parts of the digital information storage medium that are switched to read-write mode are determined by the content of the user-identifiable message.

6. The portable device of claim 1 further comprising a compiler stored in the portable device for compiling the platform validation program and obfuscating the platform validation program before being stored for use on a subsequent session.

7. The portable device of claim 1 wherein the secure data comprises a second operating system image and user data and applications.

8. The portable device of claim 7 wherein the second operating system and data is run in a virtual environment hosted by the first operating system.

9. A method for connecting a portable device to a host information processing platform, said method comprising:
  storing an operating system image, secure data, applications, and system state of a user of the portable device in a digital information storage medium of the portable device;
  connecting the portable device to the host information processing platform;
  running a platform validation program comprising a plurality of tests on the host information processing platform to determine whether said host information processing platform is safe from malicious software;
  causing the host information processing platform to present the user of the portable device with a user-identifiable message that changes every time the portable device connects to the host information processing platform and notifies said user whether the information processing platform is safe,
  wherein the user-identifiable message indicates the last time that the portable device was used, a prior host platform in which the portable device was used, the characteristics of a current host platform, selected from a group consisting of: system manufacturer name, model number, serial number, motherboard manufacturer name, processor speed, amount of memory installed and I/O devices attached to the portable device.

10. The method of claim 9 further comprising prompting the user to enter his decryption credentials for accessing secure data and programs of the host information processing platform if the plurality of tests determine that the host is safe.

11. The method of claim 10 further comprising accessing the secure data and programs to resume a suspended virtual machine.

12. The method of claim 10 wherein upon receiving and verifying the decryption credentials the platform validation program rebuilds the user-identifiable message for presentation on a subsequent session.

13. The method in claim 9 further comprising setting the digital information storage medium in read-only mode until the plurality of tests are run successfully on the host platform.

14. The method of claim 9 further comprising a compiler stored in the portable device for compiling the platform validation program and obfuscating the platform validation program before being stored for use on a subsequent session.

15. The method of claim 9 further comprising after running the tests, presenting the user with a message that the platform is safe for a level of security for data.

16. The method of claim 9 wherein running the platform validation program comprises obfuscating the platform validation program at run time to hinder the host from extracting the user-identifiable message.

17. The method of claim 16 wherein obfuscating the platform validation program at run-time comprises selecting start addresses of various code and data segments of the platform validation program when execution of the platform validation program starts.

18. The method of claim 9 wherein running the platform validation program comprises verifying an absence of a virtual machine and validity of the host platform's basic input/output system.

* * * * *